Jan. 28, 1964 T. R. HOLBROOK 3,119,169
METHOD OF MANUFACTURE OF COATED WOVEN GLASS INSECT SCREEN
Filed May 11, 1962 3 Sheets-Sheet 1
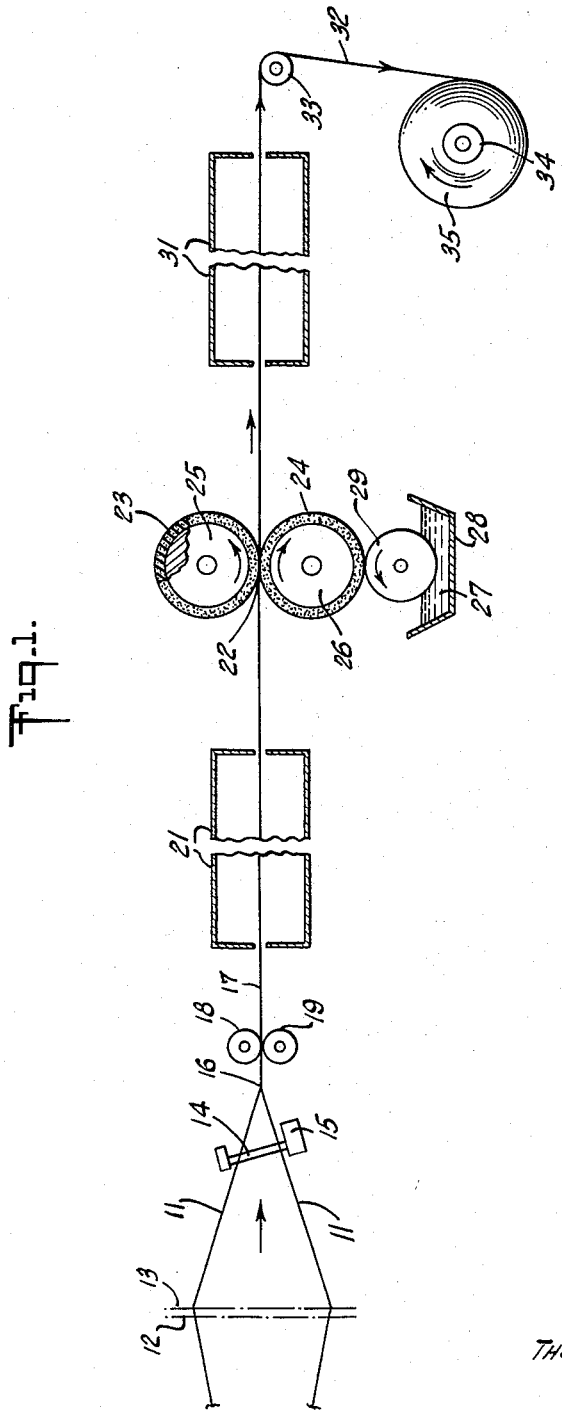
INVENTOR
THOMAS RENDER HOLBROOK
BY
Charles A. Harris
ATTORNEY Jan. 28, 1964 T. R. HOLBROOK 3,119,169
METHOD OF MANUFACTURE OF COATED WOVEN GLASS INSECT SCREEN
Filed May 11, 1962 3 Sheets-Sheet 2
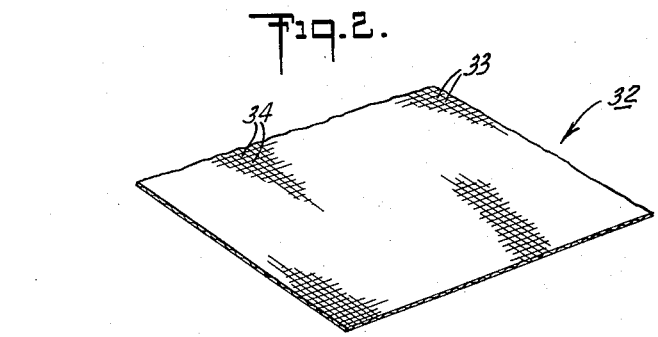
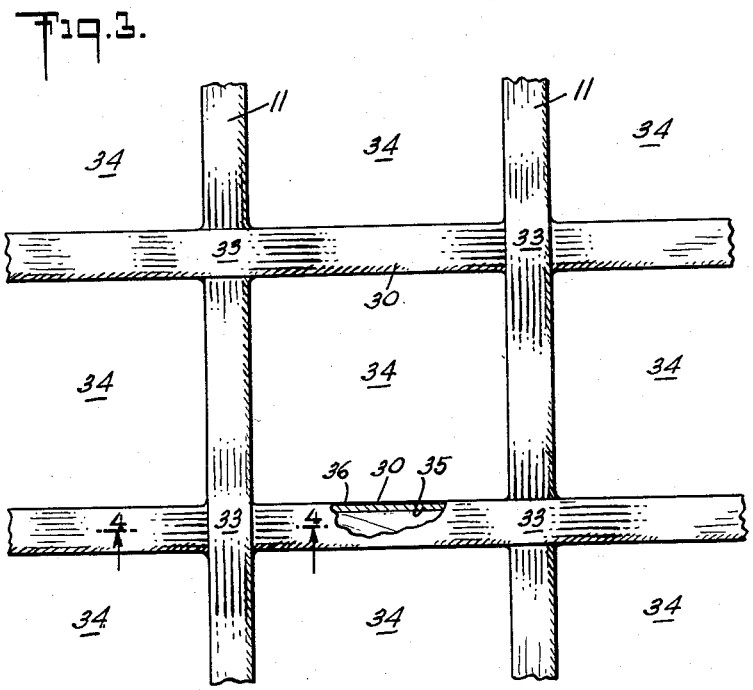
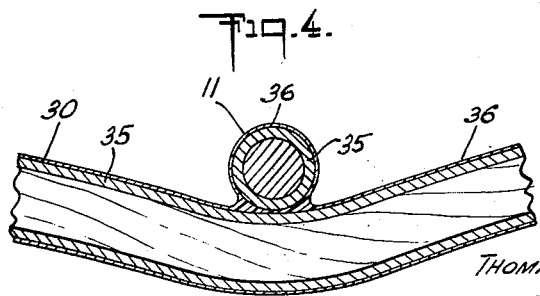
INVENTOR
THOMAS RENDER HOLBROOK
BY
Charles A. Harris
ATTORNEY Jan. 28, 1964    T. R. HOLBROOK    3,119,169
METHOD OF MANUFACTURE OF COATED WOVEN GLASS INSECT SCREEN
Filed May 11, 1962    3 Sheets-Sheet 3

INVENTOR
THOMAS RENDER HOLBROOK
BY
Charles A. Harris
ATTORNEY 3,119,169
METHOD OF MANUFACTURE OF COATED
WOVEN GLASS INSECT SCREEN
Thomas Render Holbrook, Cornelia, Ga., assignor, by mesne assignments, to Johnson & Johnson, New Brunswick, N.J., a corporation of New Jersey
Filed May 11, 1962, Ser. No. 195,664
6 Claims. (Cl. 28—74)

The present invention relates to coated woven glass insect screening and a method of manufacturing this material, more particularly to such a fabric woven from glass yarns, i.e., twisted or untwisted strands or yarns formed from glass filaments or fibers, which have been coated with a wear resistant plastic material prior to weaving.

This application is a continuation-in-part of my co-pending application Serial Number 102,214, filed in the United States Patent Office on April 11, 1961, now abandoned.

Heretofore, such fabrics have been formed by applying a primary coating of a material such as a vinyl chloride resin plastisol to the glass yarns by an extrusion method while fusing the plastisol, weaving the coated yarns to form a uniform open fabric and then fusing the primary coating to cause the yarns to adhere to one another where they cross to provide a stable fabric having openings, or windows, which are substantially uniform in size and shape. Coating the individual yarns with the desired type of material has proven to be a difficult process. For one thing, it is inherently difficult to center the coating with respect to the axis of the yarn. Due to this and other reasons primary coatings applied in this way have been thin in some places and thick in others and nonconcentric with respect to the base yarns, and broken in still other places, so that weak and open spots in the coating result. This is accentuated when the coated filaments are woven since the flexing and abrasion of the coated yarns which occurs during weaving causes many of the thin spots in the coatings to break and form additional openings in the coatings to expose more portions of the yarns. Also, when the flow point of the plastisol is reached during fusion the glass base yarns tend to become exposed where the coating is thin. The result is a fabric with poor weatherability and an unattractive appearance.

According to this invention, it has been discovered that by applying a relatively light secondary coating to the woven glass fabric after the coated glass yarns have been woven, and fusing both coatings together to form an overall coating, a fabric is provided wherein, not only are the glass yarns completely coated with a uniform layer of the overall coating so that the resulting fabric possesses decidedly improved weatherability and appearance, but the fabric also possesses decidedly improved resistance to penetration of the holes between the yarns and improved seam strength as well as certain other unexpected properties. For instance, all of the above-mentioned properties are attainable with less total coating on the glass yarns, thereby saving material and cost. In other words, according to this invention, less coating material is applied in two layers than was applied to prior art fabrics in one layer, yet unexpected improved properties results. In accordance with this invention, webs of coating material are not formed in the corners of the openings, or windows, and the shape of the windows, as originally formed between the primary coated yarns, is not appreciably changed. Because of this, the improved properties of screening according to this invention are attained with no appreciable change in the ability of the screening to exclude insects and with at least no loss in air or light permeability. In fact, since the desired stability and strength is attainable with less total coating material, as explained above, the resulting screening may be slightly more open than prior art screening for the same purpose and therefore may be even more permeable to air and light.

Another handicap of coated glass screening of the prior art is that material suitable for extrusion onto the glass yarns is somewhat limited. Consequently, the properties of the coatings of prior art glass screening have been somewhat limited. For example only certain pigments could be included in these materials and certain durable and tough materials could not be used. According to this invention, while these factors still apply to the primary coating, a wider range of materials may be used for the secondary coating since it is not extruded, depending upon the properties desired in the resulting screening.

The present invention contemplates the manufacture of coated woven glass insect screening from glass warp and weft yarns having a primary coating of a wear resistant fused extrudable vinyl plastisol substantially uniformly applied lengthwise of the filaments as described hereinbefore. The coated warp yarns are arranged in uniformly spaced relation with one another to form a warp set and the weft yarns are woven with the warp set and in uniformly spaced relation with one another to define a multiplicity of cross-overs and a multiplicity of rectangular windows, or openings, of substantially uniform size and shape between the coated yarns and form an open woven fabric. At the cross-overs the glass yarns, themselves, are maintained out of contact with one another by the primary coatings of the crossing yarns. During weaving slight crimps are formed in the crossing yarns which tend to maintain the yarns in their positions in the woven structure.

The resulting woven structure is passed through the nip formed by opposite flexible, elastic and resilient surface layers carried by a pair of coating rolls. The nip contains, or carries, a controlled amount of a secondary coating material of the same or a similar vinyl plastisol which may be brought to the nip on the surface of one of the rolls. Preferably, a thin film of the secondary coating material is applied in controlled thickness to the surface layer of each of the coating rolls so that the coating material is applied simultaneously to the top and the bottom of the woven structure as it passes through the nip. By this technique the coating material is applied most efficiently to the areas where it is needed, and the amount of coating material in contact with either the top or the bottom surface of the woven structure is minimized thereby avoiding undesirable concentrations of coating material at various places in the screening.

The secondary coated material is forced to penetrate the woven structure and surround the exposed portions of the warp and weft yarns by the pressure of the surface layers, on opposite sides of the structure as it passes through the nip. The surface layers of the coating rolls are sufficiently flexible and elastic that portions of the layer tend to enter the windows formed between the crossing yarns as the yarns pass through the nip. The fabric is removed from both of the surface layers simultaneously by withdrawing it from the nip substantially along the common line of tangency to said surfaces at the nip and without any wrap around either of the coating rolls. Thus opposed portions of the opposite surface layers simultaneously pull away from the windows in the screening as the screening leaves the nip to remove any excess coating material from the windows.

The primary coating and the secondary coating may be fused in two steps, i.e., the woven structure may be heated to fuse the primary coating together at the yarn crossovers before the secondary coating operation and later, after the secondary coating operation, to fuse the primary coating and the secondary coating together; or the primary and secondary coatings may be fused only in one step after the secondary coating is applied. In the latter case, the woven structure will not have been completely stabilized before it is passed through the coating rolls for application of the secondary coating and therefore will require more careful handling than if the two coatings are fused in two steps as described above. Fusing may be accomplished by passing the screening under tension through an oven or a clip or pin tenter which in turn may be gas fired or otherwise heated to the fusing temperature of the coating materials as will be described hereinafter.

As a result of this process, the exposed portions of the crossing warp and weft yarns are completely coated without appreciable formation of webs of coating material in the corners of the windows between the yarns and without appreciably changing the shape of the windows as originally formed between the primary coated yarns. This may be accomplished with less total coating material by initially extruding a light primary coating on the yarns and then applying a relatively light secondary coating.

For instance, preferably the primary coating is below about 45 percent by weight of the resulting screening, although heavier coatings might be desirable for some applications, and the secondary coating preferably is about 3–7 percent by weight of the screening so that the total weight of the coating preferably is below about 50 percent by weight of the screening. This compares with single coatings of about 55 percent by weight for equivalent prior art fabrics. The weight of the primary coating according to this invention may be reduced considerably so that the total weight of the coating may be considerably below 50 percent by weight. However, in order to form screening according to this invention, the primary coating should be at least about 25 percent by weight of the screening. Thus, the preferred weight range for the primary coating is about 25–45 percent by weight of the resulting screening.

Other and further advantages of the invention will be apparent from the following description and claims taken together with the drawings wherein:

FIG. 1 is a schematic view of apparatus for performing the process of this invention according to one embodiment thereof.

FIG. 2 is a schematic view in perspective of screening of this invention.

FIG. 3 is a greatly enlarged view of a portion of the screening of FIG. 2.

FIG. 4 is an even more greatly enlarged sectional view taken along the line 4—4 of FIG. 3 of a portion of the screening shown in this figure.

Figure 5:
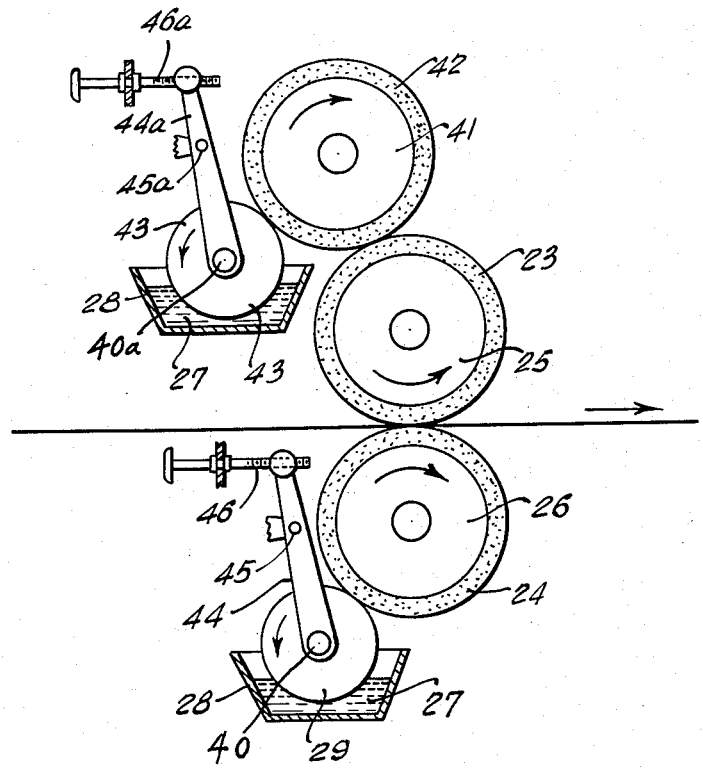
FIG. 5 is an enlarged schematic view of apparatus for performing the process of this invention according to another embodiment thereof.

Referring to FIG. 1 of the drawings, warp yarns 11 according to this invention are shown passing through a loom at the left of the figure. Since the loom represented is conventional, it is shown schematically and in part. For instance, the harnesses are represented by a pair of vertical center lines 12 and 13 passing through the peak of the shed; and a reed 14 and a transversely extending race board 15 are shown schematically to the right of the harnesses. The race board 15 carries a shuttle, not shown, which in turn lays weft yarns, also not shown, across the warp yarns 11, and the reed 14 "beats up" or positions the weft yarns at the fell 16 of the fabric. The warp yarns are spaced from one another in the loom and the weft yarns are positioned with respect to adjacent weft yarns in such a way as to form an open fabric 17 in which the yarns are substantially uniformly spaced from one another in the warp and in the weft directions to form openings, or windows, between them which are substantially uniform in size and shape as well as a multiplicity of yarn cross-overs at the corners of the windows, as will be described more fully hereinafter.

The warp yarns and the weft yarns are coated glass yarns. When the term "glass yarns" is used in this application, it means twisted or untwisted strands or yarns formed from glass filaments or fibers. The glass yarns are coated with a wear resistant vinyl plastisol capable of being fused at a fairly moderate temperature, say in the neighborhood of about 350° to 400° F. for vinyl chloride resins, for example. When the term "vinyl plastisol" is used in this application it means a dispersion of a vinyl resin in a plasticizer for the resin with or without a small amount of a solvent for the resin; the solvent being mainly for the purpose of adjusting viscosity. When the term "vinyl resin" is used in this application it means a polymer or copolymer or other polymerization product of a vinyl compound, or compounds such as vinyl chloride, vinyl acetate, vinylidine chloride, acrylic compounds, and the like. Preferably the vinyl plastisol is a "vinyl chloride plastisol," i.e., a plastisol wherein the predominant constituent of the vinyl resin is a vinyl chloride polymer or copolymer. The coating normally is applied by extruding the coating material onto the glass yarn as the yarn is passed through an extrusion orifice. The coating is applied substantially uniformly lengthwise of the yarns even through it may be thin in some spots and discontinuous in others and non-concentric with respect to the glass base yarns.

Due to the tensions applied during weaving, the yarns are crimped slightly where they cross one another. These crimps, to some extent, prevent the yarns from shifting from the positions in which they originally were placed during weaving and thereby provide the fabric with a low degree of stability which may be sufficient to prevent displacement of the yarns during subsequent processing prior to fusing of the primary coating.

At the right of the fell of the fabric 16, the fabric 17 passes through a positioning nip comprising a pair of positioning rollers 18 and 19. The fabric is led through this nip into a first gas fired pin or clip tenter 21 in which the fabric simultaneously is heated and held taut to fuse the primary coating and form a stable woven structure. When a vinyl chloride plastisol having a fusion temperature of about 350° to 400° F. is employed for the primary coating, the air arrival temperature for a gas fired tenter correspondingly would range between about 400° and 500° F. to provide the proper fusion temperature for the primary coating.

The fabric 17 is passed from the first tenter 21 directly into nip 22 formed between opposed, flexible, elastic and resilient surface layers 23 and 24 carried by a pair of steel coating rolls 25 and 26, respectively. The coating rolls are suitably mounted for rotation in bearings, not shown, which are adjustable for moving the rolls 25 and 26 toward and away from one another and regulating pressure in the nip 22.

A supply of a suitable secondary coating material is maintained in a pool 27 held in a trough 28 located below the nip formed by the coating rolls 25 and 26. A smaller feed roller 29 in rotatable contact with the surface layer 24 of the lower coating roll is mounted for rotation partially immersed in the pool 27 so that its surface continually carries a film of the secondary coating material up to the surface of the lower coating roll. When the viscosity of the coating material in the pool is adjusted to approximately 30 seconds, number 3 Zahn cup at 70° F., good results are obtained in applying the secondary coating between the surface layers 23 and 24 of the coating rolls.

The two coating rolls 25 and 26 and the feed roller 29 may be driven from a common power source, not shown. The coating rolls 25 and 26 and the feed roller 29 may be driven through separate drive belts or chains connected to an electric driving motor in a conventional manner. Rotation of the rolls 25 and 26 is synchronized so that the outer surfaces of the layers 23 and 24 carried by the rolls move at the same linear speed. Relative motion of the surfaces of the rolls 25 and 26 with respect to one another is to be avoided since it will tend to have a wiping effect and cause web formation in the windows of the fabric.

The surface layers 23 and 24 of the coating rolls 25 and 26 typically may be in the form of annular layers of flexible neoprene rubber about ½–¾ of an inch thick when the outer diameter of the rolls without the rubber is approximately 7½ inches, thereby making the overall outer diameter of the rolls approximately 8½–9 inches. The rubber is relatively soft, i.e., of approximately 70–80 durometer hardness and ground so as to have a smooth surface. The secondary coating material, which may be identical with the material used in the primary coating, is carried upward to the nip 22 between the surface layers of the coating rolls from the feed roll 29 in the form of a film on the outer surface of the lower coating roll. The amount of pickup of the coating material is adjusted so that only a small pool is formed in the nip 22. The fabric 17 preferably is led directly into the nip 22 without first wrapping around either of the coating rolls and the pressure at the nip is adjusted so that the secondary coating material is caused to penetrate the woven structure and surround all exposed portions of the warp and weft yarns of the fabric and the elastic resilient surfaces of the rubber layers 23 and 24 on the coating rolls tend to penetrate the windows of the fabric. If the pressure at this nip 22 is too great, the outer surfaces of the coating rolls will tend to place unnecessary stress on the fabric and wipe coating off the yarns, and if it is too low, coating may not be complete and webs of the coating material may tend to form across the corners of the windows to reduce the openness of the resulting screening. It is important that the fabric be removed from the nip 22 substantially along the common line of tangency to the outer surfaces of the rolls at the nip and without any wrap around either of the rolls, substantially as shown in FIG. 1. In this way the surface layers 23 and 24 of the rolls simultaneously separate from opposite sides of the fabric as the fabric leaves the nip 22. When the viscosity of the coating material and the pressure at the nip are properly adjusted as described above, this assures that there will be no appreciable web formation in the corners of the windows as the fabric leaves the nip.

The fabric next passes through a second tenter 31 which may be similar to, or identical with, the first tenter 21. The second tenter 31 applies sufficient heat to the fabric 17 while it is held taut to fuse the secondary coating together with the primary coating and provide an overall coating which covers all portions of the warp and weft yarns without appreciable formation of webs of coating material in the corners of the windows and without appreciably changing the shape of the windows as originally formed between the primary coated yarns during weaving.

After the second fusing operation, the resulting screening 32 is led around a terminal guide roll 33 and down to a driven windup drum 34 on which the finished screening is wound into a roll 35 for storage.

Although the primary and secondary coating materials need not be identical, the two coatings should be capable of fusion within approximately the same range. As suggested hereinbefore, the types of vinyl plastisols which are suitable for extrusion onto glass yarns are somewhat limited whereas a wider range of resins and plasticizers may be utilized in making up a vinyl plastisol possessing the necessary characteristics for the secondary coating according to this invention. When the plastisols of the first and second coatings are identical, a homogeneous overall coating should result. It is desirable to use plastisols for the primary and secondary coatings which, when fused in the final product, provide an integral overall coating which will not delaminate into the primary and secondary layers.

While a two-step fusion process has been described wherein the primary coating first is fused to form a stable woven structure and the secondary coating and the primary coating then are fused together after application of the secondary coating, with careful handling of the fabric prior to fusing, only one fusion operation may be necessary. The above described apparatus could be modified for this purpose by eliminating the first tenter 21 and passing the fabric into the coating nip 22 before it has been fused at all. This way the woven structure will not be stabilized until after both coatings have been fused together to form an overall coating and the overall coatings of the warp and weft yarns have been fused together at the cross-overs.

Referring to FIG. 5, there is shown apparatus for practising the process of this invention according to a preferred embodiment thereof. According to this embodiment, the secondary coating material is applied in thin films to both of the resilient surface layers 23 and 24 of the coating rolls 25 and 26, respectively, so that the coating material is applied simultaneously to the top and bottom surfaces of the woven structure as the structure passes through the nip formed by the surface layers of the rolls 25 and 26.

The coating material is applied to the surface layer 24 of the bottom roll 26 in the manner described in connection with FIG. 1. However, additional apparatus is utilized to apply the coating material to the surface layer 23 of the upper roll 25. A second pool 27 of the secondary coating material is contained in a second trough 28 located for this purpose adjacent the roll 25. A steel feed roll 43 is mounted to run partly submerged in the bath 27 to pick up coating material from the bath and carry it to the resilient surface layer 42 of a transfer roll 41 mounted for rotation above the coating roll 25. The rolls 41 and 25 are mounted and driven so that coating material carried on the surface of the transfer roll 41 will be transferred to the surface layer 23 of the roll 25. The resilient surface layer 42 of the roll 41 may consist of flexible neoprene rubber of substantially the same texture and characteristics as the surface layer 23 of the roll 25.

Normally pick up and transfer of the secondary coating material is controlled so that the films of this material carried by the surface layers 23 and 24 are of the same thickness. This is accomplished by adjusting the rolls 29 and 42 toward and away from the rolls 26 and 41, respectively, in such a way that this result is achieved. This adjustment is accomplished in the case of the rolls 29 and 43 by the use of identical apparatus identified by the numerals 40, 44, 45, and 46, for the roll 29; and 40a, 44a, 45a, and 46a, for the roll 43. Since the apparatus operates in the same fashion for each of the rolls 29 and 43a, it will be described specifically only in connection with the former.

The roll 29 is fixedly mounted on a shaft 40 which extends into bearings provided at the lower ends of a pair of adjustable lever arms 44. Each of the lever arms is mounted for pivoting about a pivot pin 45 secured to a bracket extending from a suitable support, not shown. The opposite end of each lever arm is threaded on an adjusting bolt 46 which passes through the structure of the support. Thus, the roll 29 may be adjusted toward the roll 26 by turning the bolts 46 in such a way that they will retract the upper ends of the lever arms 44 and thereby swing the bottom ends of the arms supporting the roller 29 toward the roll 26. Adjustment of the roll 29 away from the roll 26 is accomplished by turning the bolts 46 in the opposite direction. As indicated above, adjustment of the roll 43 toward and away from the roll 42 is accomplished in the same manner.

By applying the secondary coating material in films carried by each of the nip rolls 25 and 26, the thickness of the films passing through the nip is kept to a minimum, thereby avoiding the possibility of concentrating the coating material in uneven portions of the woven fabric structure. Since all exposed surfaces of the yarns making up the coating structure must be fully coated, the secondary coating material may be applied most efficiently to the areas where it is needed by the simultaneous application of the coating material to the top and bottom surfaces of the woven structure and by the subsequent inward pressure of the resilient surfaces of the nip rolls upon the coating material applied.

Typical screening 32 produced according to this invention is shown schematically in FIGS. 2–4. FIG. 2 shows screening comprising a multiplicity of warp yarns 11 and weft yarns 30 forming a multiplicity of yarn cross-overs 33 and a multiplicity of rectangular windows 34 defined between the yarns. The yarns in FIGS. 2 and 3 are substantially uniformly spaced from one another in the warp and weft directions in the fabric, the warp yarns being those extending vertically in FIG. 3, so that the windows 34 are substantially uniform in size and shape. All of the yarns carry a primary coating 35 which is relatively heavy, i.e., weighing at least about 25 percent by weight of the screening and a secondary coating 36 which is relatively light, i.e., preferably about 3–5 percent by weight of the screening. As shown in FIG. 4, regardless of whether or not the secondary coating 36 gets into the space between each warp and weft yarn at the cross-overs, the primary coating 35 maintains the glass portions of the yarns out of contact with one another. This is important to prevent glass to glass abrasion at the cross-overs 33 and for stability and flex resistance. The overall coating formed by the fusion of the primary and secondary coating together covers all portions of the warp and weft yarns and where the secondary coating is applied to a portion of a yarn where the primary coating is thin or removed, the secondary coating will tend to fill in the depression or hole to provide a continuous overall coating.

Referring to FIG. 3, it will be seen that there is no appreciable formation of webs of coating material in the corners of the windows 34 and that the shape of the windows is rectangular and essentially that of the space originally formed between the primary coated yarns. Thus, screening according to this invention with an overall coating formed by the fusion of the primary and secondary coatings is substantially as open as when the yarns with just the primary coating first were woven. Needless to say, as mentioned hereinbefore, since the primary coating may be considerably lighter than coatings used in prior art screening where only a single coating was employed, and the secondary coating according to this invention is comparatively light, the resulting screening may be even more open than comparable prior art screening and therefore possess improved air and light permeability.

Screening, according to this invention, possesses unusually good weatherability, that is it retains its tensile strength and stability and is not subject to stuffing, or chipping, off of the coating in use. The coating is continuous and remains continuous without surface impairment and therefore has an excellent appearance which is important in screening. Surprisingly, screening according to this invention possesses definitely improved resistance to penetration, seam strength, nailing strength, ravel resistance, etc., all of which are related to stability; as well as improved flex life, i.e., neither the overall coating nor the glass yarns themselves rupture or crack when exposed to prolonged flexure. All of the above improved properties are attainable with no loss in insect exclusion or air and light permeability. Surprisingly again, all of this can be accomplished at reduced cost since every one of these characteristics is attainable in screening according to this invention with less total coating material than has been employed in comparable coated screening of the prior art.

Having now described the invention in specific detail and exemplified the manner in which it may be carried into practice, it will be readily apparent to those skilled in the art that innumerable variations, applications, modifications, and extensions of the basic principles involved may be made without departing from its spirit or scope.

What is claimed is:

1. The process of manufacturing coated woven glass insect screening from glass warp and weft yarns having a primary coating of a wear resistant fused extrudable vinyl plastisol substantially uniformly applied lengthwise of the yarns, which comprises; arranging said coated warp yarns in uniform spaced relation with one another to form a warp set, weaving said weft yarns with said warp set and in uniform spaced relation with one another to define a multiplicity of filament cross-overs and a multiplicity of rectangular windows of substantially uniform size and shape between the coated yarns and form a woven fabric, passing said fabric through the nip formed between opposed, flexible, elastic and resilient surface layers carried by a pair of coating rolls, said nip containing a controlled amount of a vinyl plastisol secondary coating material, forcing said secondary coating material to penetrate the woven structure and surround the exposed portions of said coated warp and weft yarns by pressing said structure between said surface layers, removing said fabric simultaneously from both of said surfaces by withdrawing it from the nip substantially along the common line of tengency to said surfaces at the nip and without any wrap around either of said rolls, and heating said yarns to fuse the primary and secondary coatings together and adhere the coated yarns firmly to one another at the cross-overs and form an integral overall coating covering all portions of the warp and weft yarns without appreciable formation of webs of coating material in the corners of the windows and without appreciably changing the shape of the windows as originally formed between the primary coated yarns.

2. The process of manufacturing coated woven glass insect screening from glass warp and weft yarns having a primary coating of a wear resistant fused extrudable vinyl plastisol substantially uniformly applied lengthwise of the yarns, which comprises; arranging said coated warp yarns in uniform spaced relation with one another to form a warp set, weaving said weft yarns with said warp set and in uniform spaced relation with one another to define a multiplicity of filament cross-overs and a multiplicity of rectangular windows of substantially uniform size and shape between the coated yarns and form a woven fabric, continuously applying a film of a vinyl plastisol secondary coating material in controlled thickness to each of opposed, flexible, elastic and resilient surface layers carried by a pair of coating rolls arranged to form a nip between said layers, passing said fabric through said nip and forcing said secondary coating material to penetrate the woven structure and surround the exposed portions of said coated warp and weft yarns by pressing said structure between said surface layers, removing said fabric simultaneously from both of said surfaces by withdrawing it from the nip substantially along the common line of tangency to said surfaces at the nip and without any wrap around either of said rolls, and heating said yarns to fuse the primary and secondary coatings together and adhere the coated yarns firmly to one another at the cross-overs and form an integral overall coating covering all portions of the warp and weft yarns without appreciable formation of webs of coating material in the corners of the windows and without appreciably changing the shape of the windows as originally formed between the primary coated yarns.

3. A process of manufacturing coated woven glass insect screening from a woven fabric comprising warp and weft yarns having a primary coating of a wear resistant fused extrudable vinyl plastisol substantially uniformly applied lengthwise of the yarns, said coated yarns being arranged in uniform spaced relation with one another in the warp and the weft directions in the fabric to define a multiplicity of yarn cross-overs and a multiplicity of rectangular windows of substantially uniform size and shape between the coated yarns, the glass yarns themselves being maintained out of contact with one another at the cross-overs by their respective primary coatings, which comprises; coating said primary coated yarns with a thin layer of a vinyl plastisol secondary coating material substantially throughout their surface area except where the primary coated yarns are in contact with one another at the cross-overs, and heating said yarns to fuse the primary and secondary coatings together and adhere the coated yarns firmly to one another at the cross-overs and form an integral overall coating covering all portions of the warp and weft yarns without appreciable formation of webs of coating material in the corners of the windows and without appreciably changing the shape of the windows as originally formed between the primary coated yarns.

4. A process of manufacturing coated woven glass insect screening according to claim 3, wherein the secondary coating is performed by continuously applying a film of a vinyl plastisol secondary coating material in controlled thickness to each of opposed, flexible, elastic and resilient surface layers carried by a pair of coating rolls arranged to form a nip between said layers, and passing said fabric through said nip and forcing said secondary coating material to penetrate the woven structure and surround the exposed portions of said coated warp and weft yarns by pressing said structure between said surface layers.

5. A process of manufacturing coated woven glass insect screening from a woven fabric comprising warp and weft yarns having a primary coating of a wear resistant fused extrudable vinyl plastisol substantially uniformly applied lengthwise of the yarns, said coated yarns being arranged in uniform spaced relation with one another in the warp and the weft directions in the fabric to define a multiplicity of rectangular windows of substantially uniform size and shape between the coated yarns, and being heated to fuse the primary coatings of the crossing yarns and bond them together while maintaining said glass yarns out of contact with one another and substantially in the position in which they were woven to form a stable woven structure, which comprises; passing said fabric through the nip formed between opposed, flexible, elastic and resilient surface layers carried by a pair of coating rolls, said nip containing a controlled amount of a vinyl plastisol secondary coating material, forcing said secondary coating material, to penetrate the woven structure and surround the exposed portions of said coated warp and weft yarns by pressing said structure between said surface layers, removing said fabric simultaneously from both of said surfaces by withdrawing it from the nip substantially along the common line of tangency to said surfaces at the nip and without any wrap around either of said rolls, and heating said coated yarns to fuse the secondary coating together and adhere the coated yarns firmly to one another at the cross-overs and form an integral overall coating covering all portions of the wrap and weft yarns without appreciable formation of webs of coating material in the corners of the windows and without appreciably changing the shape of the windows as originally formed between the primary coated yarns.

6. A process of manufacturing coated woven glass insect screening from a woven fabric comprising warp and weft yarns having a primary coating of a wear resistant fused extrudable vinyl plastisol substantially uniformly applied lengthwise of the yarns, said coated yarns being arranged in uniform spaced relation with one another in the warp and the weft directions in the fabric to define a multiplicity of rectangular windows of substantially uniform size and shape between the coated yarns, and being heated to fuse the primary coatings of the crossing yarns and bond them together while maintaining said glass yarns out of contact with one another and substantially in the position in which they were woven to form a stable woven structure, which comprises; continuously applying a film of a vinyl plastisol secondary coating material in controlled thickness to each of opposed, flexible, elastic and resilient surface layers carried by a pair of coating rolls arranged to form a nip between said layers, passing said fabric through said nip and forcing said secondary coating material, to penetrate the woven structure and surround the exposed portions of said coated warp and weft yarns by pressing said structure between said surface layers, removing said fabric simultaneously from both of said surfaces by withdrawing it from the nip substantially along the common line of tangency to said surfaces at the nip and without any wrap around either of said rolls, and heating said coated yarns to fuse the secondary coating together and adhere the coated yarns firmly to one another at the cross-overs and form an integral overall coating covering all portions of the warp and weft yarns without appreciable formation of webs of coating material in the corners of the windows and without appreciably changing the shape of the windows as originally formed between the primary coated yarns.

References Cited in the file of this patent
UNITED STATES PATENTS

| | | |
|---|---|---|
| 2,213,883 | Lurie | Sept. 3, 1940 |
| 2,812,570 | Petersilie et al. | Nov. 12, 1957 |
| 2,867,891 | Horton et al. | Jan. 13, 1959 |
| 2,874,729 | Ball | Feb. 24, 1959 |
| 3,060,549 | Horton | Oct. 30, 1962 |